United States Patent
Lin et al.

(10) Patent No.: US 6,659,657 B2
(45) Date of Patent: Dec. 9, 2003

(54) EASILY ASSEMBLED TRANSCEIVER MODULE WITH HIGH YIELD RATE

(75) Inventors: You-Nain Lin, Taipei Hsien (TW); Chuan-Chung Hsieh, Taoyuan Hsien (TW)

(73) Assignee: Delta Electronics Inc., Taoyuan Sien (TW)

( * ) Notice: Subject to any disclaimer, the term of this patent is extended or adjusted under 35 U.S.C. 154(b) by 44 days.

(21) Appl. No.: 10/011,290

(22) Filed: Dec. 11, 2001

(65) Prior Publication Data

US 2002/0181901 A1 Dec. 5, 2002

(30) Foreign Application Priority Data

May 30, 2001 (TW) .................................. 90208818 U

(51) Int. Cl.[7] .................................................. G02B 6/36
(52) U.S. Cl. ............................. 385/92; 385/76; 385/88
(58) Field of Search ......................... 385/76, 77, 78, 385/79, 87, 88, 89, 90, 91, 92, 93, 94

(56) References Cited

U.S. PATENT DOCUMENTS

| | | | | |
|---|---|---|---|---|
| 5,596,665 A | * | 1/1997 | Kurashima et al. ........... | 385/92 |
| 5,617,495 A | * | 4/1997 | Funabashi et al. ............ | 385/92 |
| 5,633,971 A | * | 5/1997 | Kurashima .................... | 385/78 |
| 5,647,042 A | * | 7/1997 | Ochiai et al. ................. | 385/56 |
| 5,661,834 A | * | 8/1997 | Watanabe et al. ............ | 385/92 |
| 5,879,173 A | * | 3/1999 | Poplawski et al. .......... | 439/138 |
| 6,048,106 A | * | 4/2000 | Iwase .......................... | 385/88 |
| 6,227,721 B1 | * | 5/2001 | Naito et al. ................... | 385/78 |
| 6,257,773 B1 | * | 7/2001 | Moriyama et al. ............ | 385/92 |
| 6,511,233 B1 | * | 1/2003 | Steijer et al. ................. | 385/88 |

* cited by examiner

*Primary Examiner*—Robert H. Kim
*Assistant Examiner*—Michael H Caley
(74) *Attorney, Agent, or Firm*—Birch, Stewart, Kolasch & Birch, LLP

(57) ABSTRACT

The transceiver module includes a lower housing, a board, a transmitting subassembly, a receiving subassembly, a lower housing and a clamp. The transmitting subassembly further includes a laser diode pack, a lower sleeve and an upper sleeve. The laser diode pack is plugged into one terminal of the lower sleeve. Besides, the lower sleeve connects the laser diode pack with the upper sleeve. The upper sleeve has a flange formed on a middle of the upper sleeve. Via the flange, the groove of the lower housing fixes the transmitting subassembly. The lower housing is connected to the lower housing and encapsulating the board, the transmitting subassembly and the receiving subassembly.

6 Claims, 5 Drawing Sheets

EASILY ASSEMBLED TRANSCEIVER MODULE WITH HIGH YIELD RATE

BACKGROUND OF THE INVENTION

1. Field of the Invention

The present invention relates to a transceiver module, and more particularly to an easily assembled optoelectronic transceiver module with high yield rate.

2. Description of the Prior Art

An optoelectronic transceiver module is used to transform an optical signal coming from an optical fiber connector to an electrical signal, or transform an electrical signal to an optical signal. A photo diode contained by the optoelectronic transceiver transforms the optical signal to the electrical signal and then sends the electrical signal to a processing circuit. A laser diode contained by the optoelectronic transceiver transforms the electrical signal coming from the processing circuit to the optical signal and then outputs.

As shown in FIG. 1(a), the conventional single mode transceiver includes a lower housing 10, an upper housing 20, a laser diode subassembly 30, a photo diode subassembly 60, a board 70 and a clamp 80. The laser diode subassembly 30 and the photo diode subassembly 60 are mounted on the board 70. The lower housing 10 is used to accommodate the laser diode subassembly 30 and the photo diode subassembly 60 and support the board 70. The lower housing 10 further includes two grooves 15 formed in one terminal of the lower housing. Each groove 15 has a semi-circular portion used to fix the laser diode subassembly 30 and the photo diode subassembly 60. Besides, the laser diode subassembly 30 and the photo diode subassembly 60 pass through the holes of the clamp 80. In this manner, the laser diode subassembly 30 and the photo diode subassembly 60 are optically coupled and connected with an optical fiber connector (not shown).

As shown in the assembling flowchart of the laser diode subassembly 30 illustrated in the FIG. 1(b), the laser diode subassembly 30 consists of a laser diode pack 40 and a sleeve 50. Among these, for the single mode transceiver, the sleeve 50 is composed of an upper sleeve 51 and a lower sleeve 53. In addition, the upper sleeve 51 has an upper flange 52 and the lower sleeve 53 has a lower flange 55. In general, the radius of the lower flange 55 is larger than the radius of the upper flange 52. The radius of the lower flange 55 is substantially the same with the radius of the semi-circular portion of the groove 15.

Referring to FIG. 1(a)-FIG. 1(c), for the single mode transceiver, the core of the single mode optical fiber has a radius of 9 $\mu$m. Hence, it is strict with the requirement for the alignment of the optical. The optical axis of the laser diode pack 40 has to be aligned to the single mode optical fiber accurately. For this purpose, the cap 41 (e.g. To-can) of the laser diode pack 40 is plugged into the lower sleeve 53 through the terminal opposite to the lower flange 55 of the lower sleeve during assembling. Then, the lower flange 55 of the resultant structure is connected with the upper flange 52 of the upper sleeve 51 using laser-welding method.

During the laser-welding process, an optical fiber (not shown) and a testing device (not shown) are connected with the terminal opposite to the upper flange 52 of the upper sleeve 51. Besides, the lower sleeve 53 slightly moves on the interface between the lower flange 55 and the upper flange 52. Meanwhile, the testing device measures the optical coupling efficiency of the laser beam, emitting from the laser diode pack 40, respective to the optical fiber. Once the lower sleeve 53 moves to a position relative to the upper sleeve 51 and thus the optimum optical coupling efficiency is available for the testing device, a laser-welding apparatus forms several welding joints on the interface between the lower flange 55 and the upper flange 52. In this manner, the upper sleeve 51 is connected with the lower sleeve 53.

However, prior art encountered great difficulties in aligning the optical axis of the laser diode pack 40 to the central axis 56 of the lower sleeve 53 due to numerous reasons. As a result, the central axis 56 of the lower sleeve 53 fails to be aligned with the central axis 57 of the upper sleeve 51. For example, as shown in FIG. 1(b), the central axis 57 of the upper sleeve 51 is above the central axis 56 of the lower sleeve 53. Under these conditions, the laser diode pack 40 cannot be positioned in the lower housing 10 and cannot be fixed in the groove 15. This causes the lower housing 10 and the upper housing 20 to fail in tight fit. As shown in FIG. 1(c), this is because the height of resultant structure consisting of the lower sleeve 53 and the lower flange 55 exceeds the tolerance T provided by the lower housing 10 and the upper housing 20. As a result, the transceiver fails to be assembled and which leads to lower yield rate. The laser diode subassembly 30 is thus scrapped or reworked, and the manufacturing cost of the conventional transceiver is raised due to the lower yield rate.

Accordingly, there is a strongly felt need for an easily assembled optoelectronic transceiver module with high yield rate.

SUMMARY OF THE INVENTION

Consideration of the disadvantages of the conventional transceiver module described above, the main object of the present invention is to provide an easily assembled optoelectronic transceiver module with high yield rate.

The present transceiver module is coupled to a single mode optical fiber. The transceiver module includes a lower housing, a board, a transmitting subassembly, a receiving subassembly, a lower housing, and a clamp. The lower housing further includes at least one groove provided at one terminal of the lower housing. The groove is used to fix the transmitting subassembly and the receiving subassembly. The transmitting subassembly may be a laser diode subassembly and is used to emit laser beam. The receiving subassembly may be a photo diode subassembly and is used to accept the optical signal from the optical fiber coupled to the transceiver module. The received optical signal is sent to the board. The board is formed on the lower housing and electrically coupled to the transmitting subassembly and the receiving subassembly. Besides, there are other electrical devices, processing the optical signal, formed on the board. However, they are not illustrated since they are not features of the present invention.

The transmitting subassembly is formed in the lower housing and electrically coupled to the board. It should be noted that the transmitting subassembly further includes a laser diode pack, an upper sleeve and a lower sleeve. Among these, the laser diode pack emits laser beam. The upper sleeve includes a flange formed at a middle of the upper sleeve. The radius of the flange is substantially the same with the radius of the groove described above. Therefore, the groove can fix the flange. In addition, the respective terminal of the transmitting subassembly and the receiving subassembly passes through the preformed holes of the clamp. The clamp is used to clamp an optical fiber connector and make the transmitting subassembly and the receiving subassembly be coupled to the optical fiber.

The cap of the laser diode pack is plugged into one terminal of the lower sleeve. Then, the laser diode pack is connected with the upper sleeve via another terminal of the lower sleeve. For example, the upper sleeve is connected with the lower sleeve using laser-welding method. When the relative position of the upper sleeve and the lower sleeve can make a measuring device obtain the optimum optical coupling efficiency, the laser-welding apparatus forms several welding joints on the joint interface between the upper sleeve and the lower sleeve.

The receiving subassembly is positioned in the lower housing and electrically coupled to the board. The receiving subassembly responds to the optical signal of the optical fiber. The upper housing combined with the lower housing encapsulates the board, the transmitting subassembly and the receiving subassembly.

According to the present invention, the transmitting subassembly includes merely a single flange. Thus, the resultant structure composed of the laser diode pack and the lower sleeve does not interfere with the tight fit of the lower housing and the upper housing, even though the upper sleeve is misaligned to the lower sleeve. This is because the malposition (e.g. the joint interface between the upper sleeve and the lower sleeve) is shifted to the interior of the lower housing. The interior of the lower housing has adequate space to accommodate the transmitting subassembly with malposition. Therefore, the present transceiver has increased yield rate and is easily assembled.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1A:
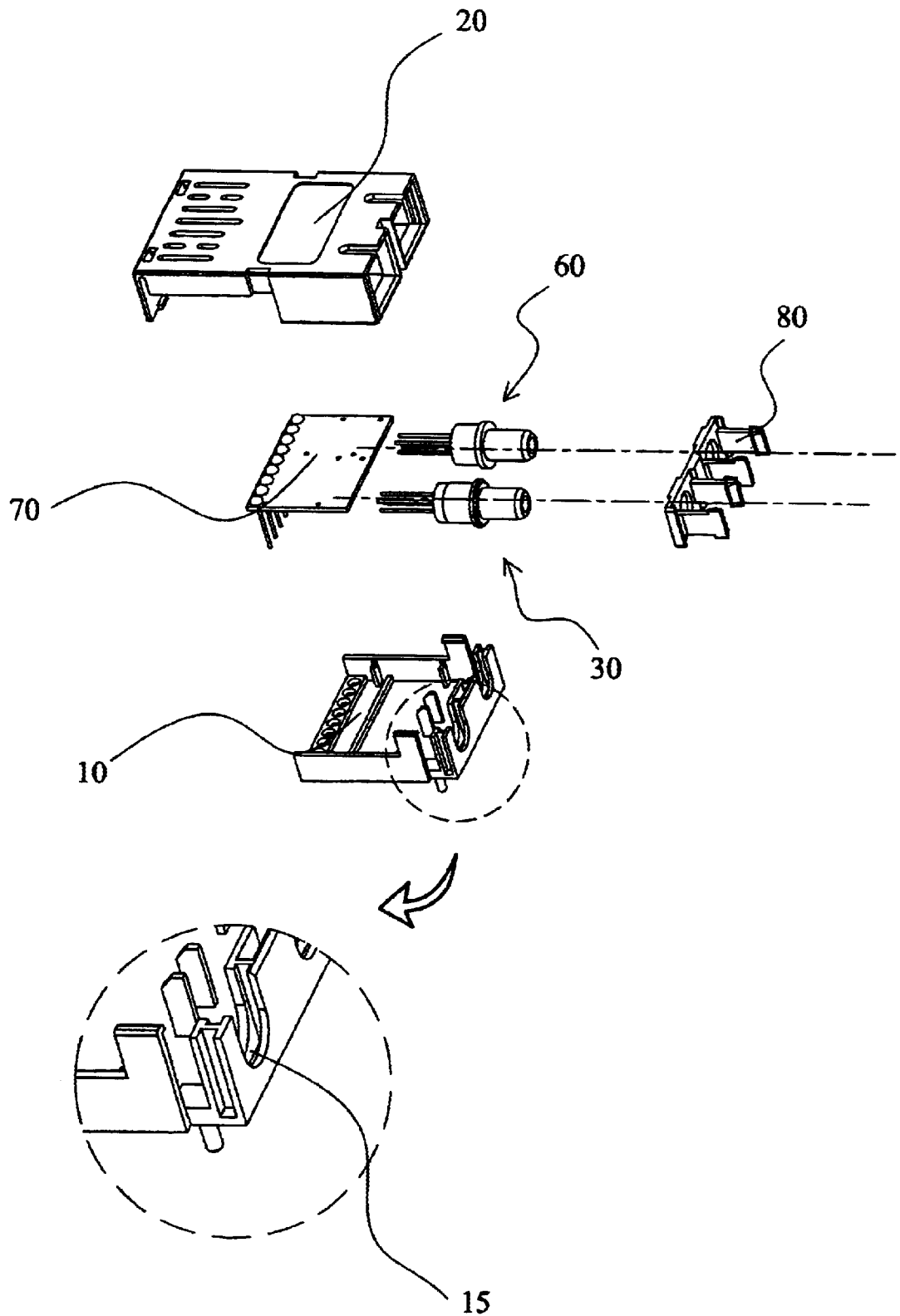
FIG. 1(a) shows an exploded view illustrating an conventional transceiver module.
Figure 1B:
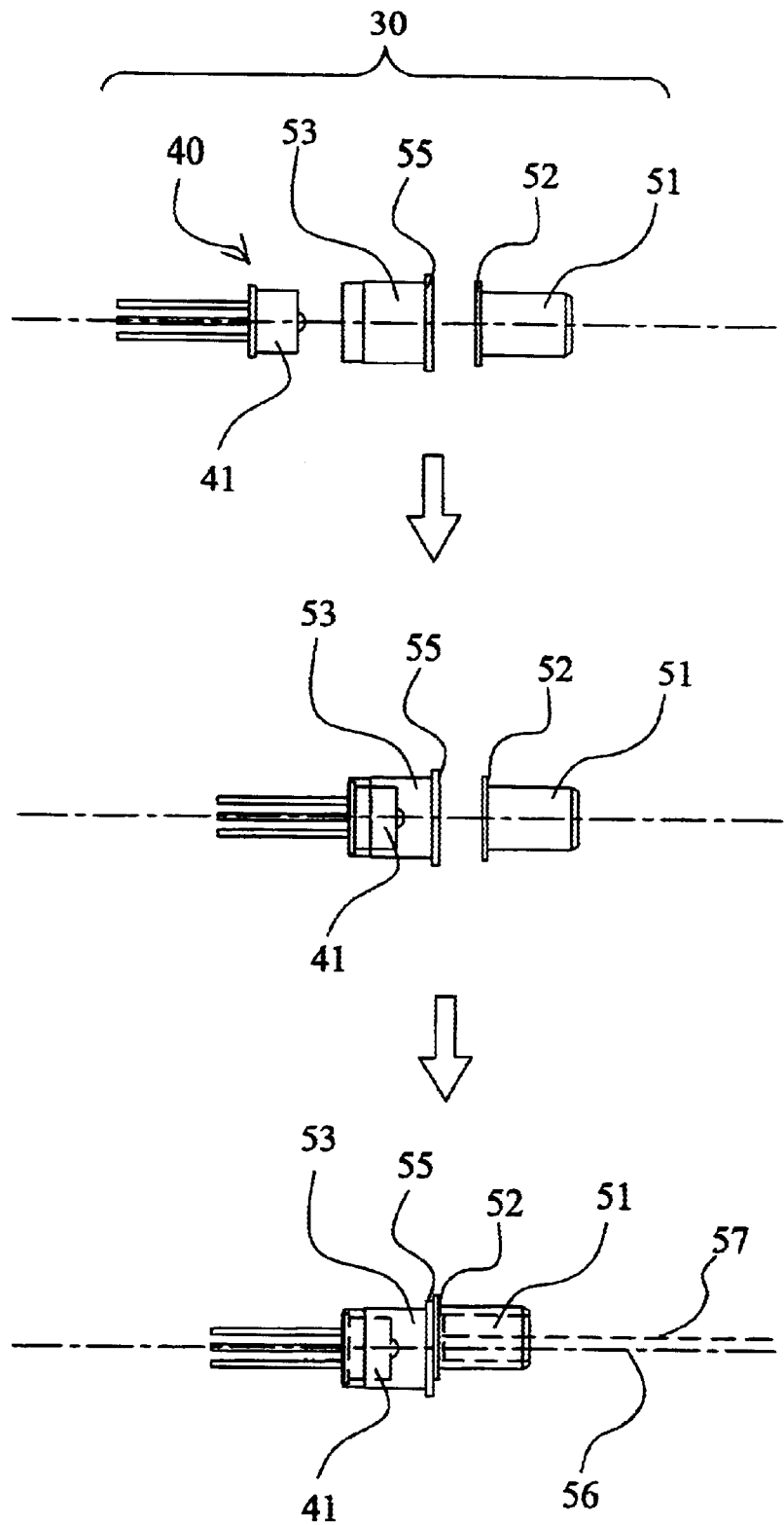
FIG. 1(b) depicts the exploded view illustrating the laser diode subassembly of the conventional transceiver module shown in FIG. 1(a)
Figure 1C:
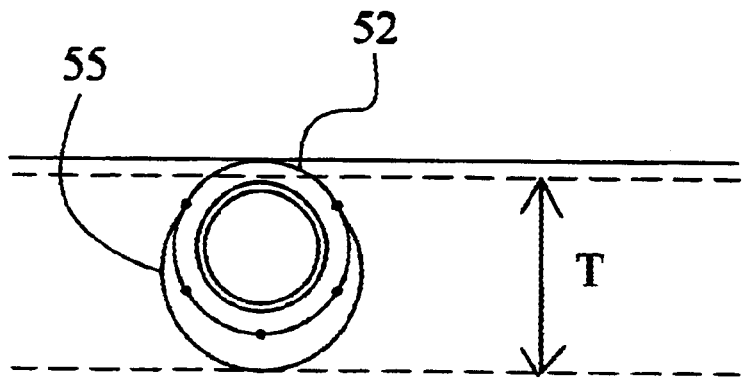
FIG. 1(c) depicts the cross-sectional view illustrating the laser diode subassembly of the conventional transceiver module shown in FIG. 1(a)
Figure 2:
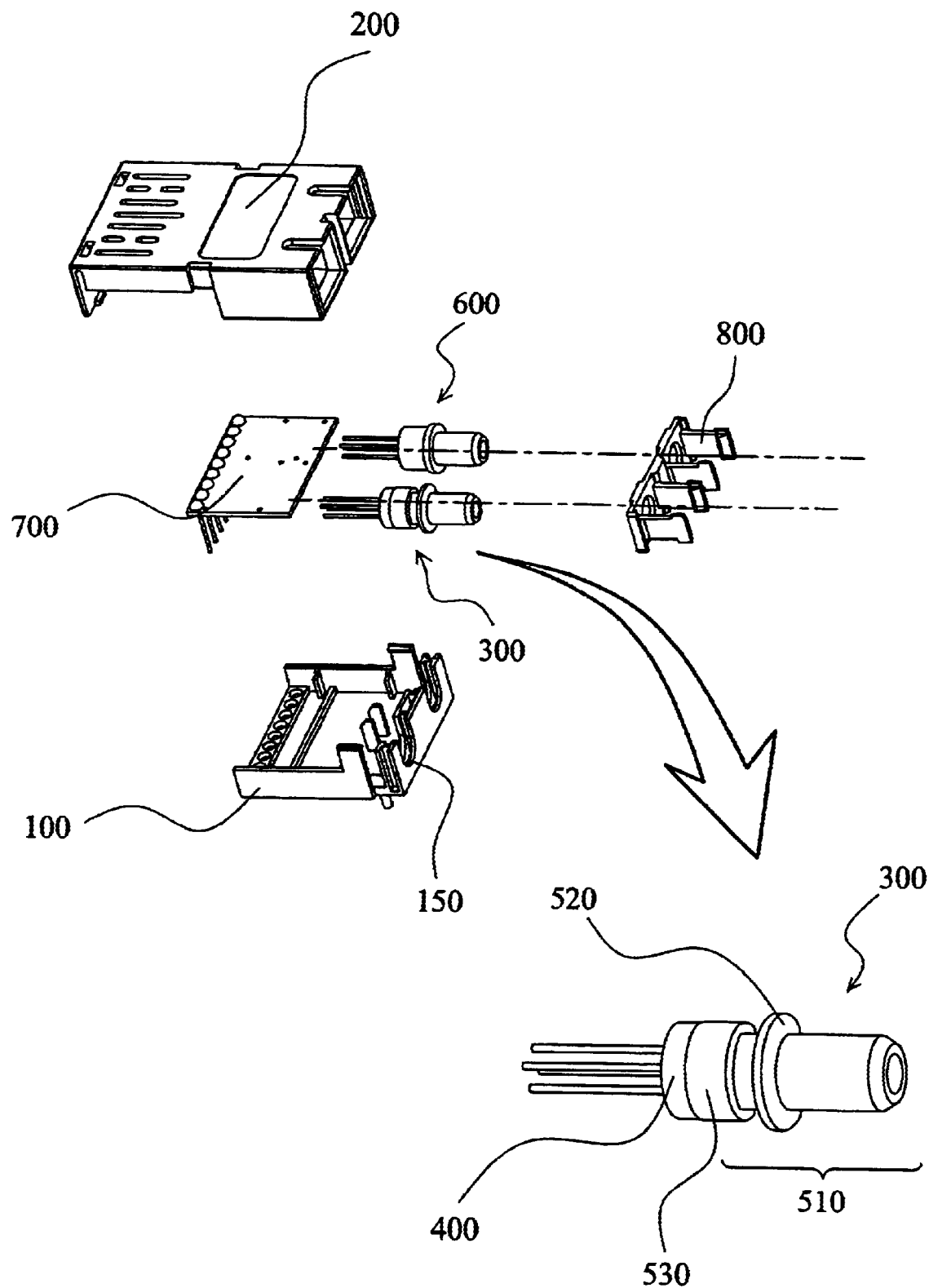
FIG. 2 shows an exploded view illustrating the transceiver module according to the present invention.

The present transceiver module is coupled to a single mode optical fiber. Referring to FIG. 2, the transceiver module includes a lower housing 100, a board 700, a transmitting subassembly 300, a receiving subassembly 600, a lower housing 200, and a clamp 800. The lower housing 100 further includes at least one groove 150 provided at one terminal of the lower housing. The groove 150 is used to fix the transmitting subassembly 300 and the receiving subassembly 600. The transmitting subassembly 300 may be a laser diode subassembly and is used to emit laser beam. The receiving subassembly 600 may be a photo diode subassembly and is used to accept the optical signal from the optical fiber coupled to the transceiver module. Then, the received optical signal is sent to the board 700. The board 700 is formed on the lower housing 100 and electrically coupled to the transmitting subassembly 300 and the receiving subassembly 600. Besides, there are other electrical devices, processing the optical signal, formed on the board 700. However, they are not illustrated since they are not features of the present invention.

Still referring to FIG. 2, the transmitting subassembly 300 is formed in the lower housing 100 and electrically coupled to the board 700. It should be noted that the transmitting subassembly 300 further includes a laser diode pack 400, an upper sleeve 510 and a lower sleeve 530. Among these, the laser diode pack 400 emits laser beam. The upper sleeve 510 includes a flange 520 formed at a middle of the upper sleeve. The radius of the flange 520 is substantially the same with the radius of the groove 150 described above. Therefore, the groove 150 can fix the flange 520. In addition, the respective terminal of the transmitting subassembly 300 and the receiving subassembly 600 passes through the preformed holes of the clamp 800. The clamp 800 is used to clamp an optical fiber connector (not shown) and make the transmitting subassembly 300 and the receiving subassembly 600 be coupled to the optical fiber.

Figure 3:
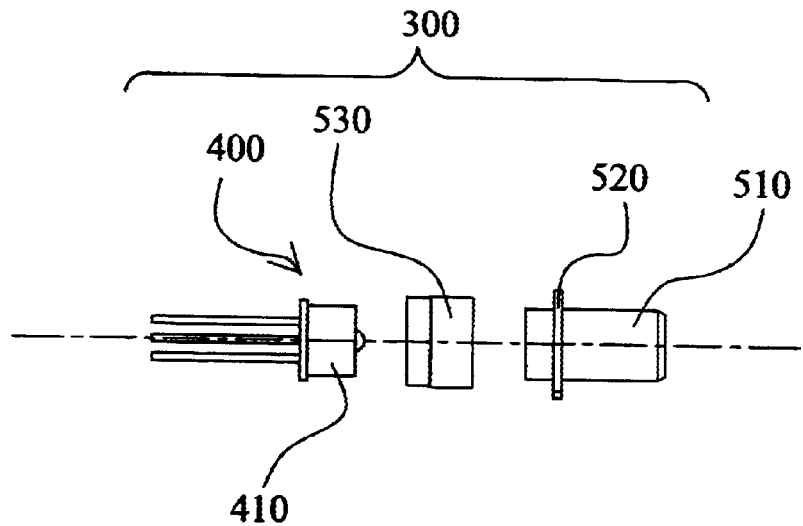
FIG. 3 shows an exploded view illustrating the transmitting subassembly according to the present invention.

Referring to FIG. 3, according to the present invention, the cap 410 (e.g. a To-can) of the laser diode pack 400 is plugged into one terminal of the lower sleeve 530. Then, the laser diode pack 400 is connected with the upper sleeve 510 via another terminal of the lower sleeve 530. For example, the upper sleeve 510 is connected with the lower sleeve 530 using laser-welding method. When the relative position of the upper sleeve 510 and the lower sleeve 530 can make a measuring device obtain the optimum optical coupling efficiency, the laser-welding apparatus forms several welding joints on the joint interface between the upper sleeve 510 and the lower sleeve 530.

Please turn to FIG. 2, the receiving subassembly 600 is positioned in the lower housing 100 and electrically coupled to the board 700. The receiving subassembly 600 responds to the optical signal of the optical fiber (not shown). The upper housing 200 combined with the lower housing 100 encapsulates the board 700, the transmitting subassembly 300 and the receiving subassembly 600.

Figure 4:
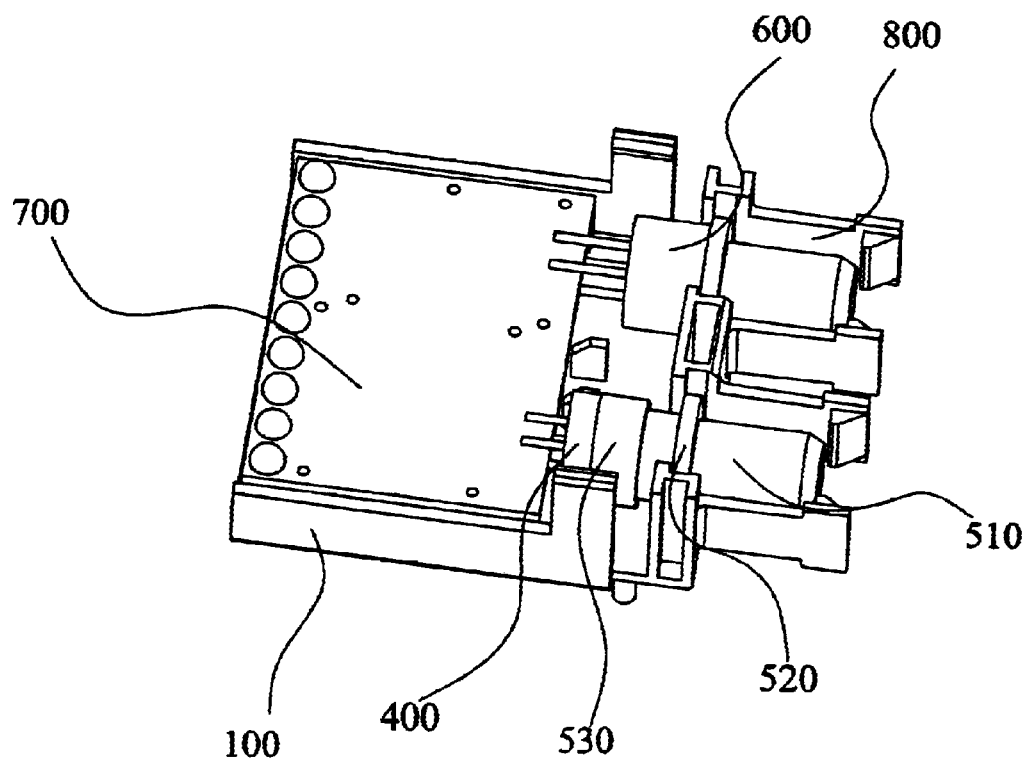
FIG. 4 shows a perspective schematic view illustrating the transceiver module according to the present invention.

Referring to FIG. 4, it should be noted that the transmitting subassembly 300 includes merely a single flange 530. Thus, the resultant structure composed of the laser diode pack 400 and the lower sleeve 530 does not interfere with the tight fit of the lower housing 100 and the upper housing 200, whether the upper sleeve 510 is aligned to the lower sleeve 530 or not. This is because the malposition (e.g. the joint interface between the upper sleeve 510 and the lower sleeve 530 is not connected properly) is shifted to the interior of the lower housing 100. The interior of the lower housing 100 has adequate space to accommodate the transmitting subassembly 300 with malposition. Therefore, the present transceiver has increased yield rate and is easily assembled.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A transceiver module, coupled to an optical fiber, said transceiver module comprising:

a lower housing, having a terminal including at least one groove formed thereon:

a board, formed in said lower housing and used to process an optical signal:

a transmitting subassembly, formed in said lower housing and electrically coupled to said board, said transmitting subassembly further comprising:

a laser diode pack:

an upper sleeve, having a flange formed on a middle of said upper sleeve and inserted into the groove;

a lower sleeve, said laser diode pack being plugged into a terminal of said lower sleeve, said lower sleeve connecting said laser diode pack and said upper sleeve;

a receiving subassembly, formed in said lower housing and electrically coupled to said board, said receiving subassembly responding to said optical signal from said optical fiber; and an upper housing, connected to said lower housing and encapsulating said board, said transmitting subassembly and said receiving subassembly.

2. The transceiver module according to claim 1, wherein said transceiver module is a single mode transceiver module.

3. The transceiver module according to claim 1, wherein said transmitting subassembly is used to emit a laser beam.

4. The transceiver module according to claim 1, wherein said board is used to process optical signal.

5. The transceiver module according to claim 1, wherein said groove is substantially semi-circular.

6. The transceiver module according to claim 1, further comprises a clamp used to optically couple said transmitting subassembly and said receiving subassembly with an optical fiber, respectively.

* * * * *